(12) United States Patent
Levis (10) Patent No.: US 7,600,798 B2
(45) Date of Patent: Oct. 13, 2009

(54) DEVICE FOR TRANSPORTING SEGMENTS OF WOOD AND A METHOD OF PACKAGING SEGMENTS OF WOOD

(75) Inventor: Christian Levis, Maubec (FR)

(73) Assignee: Arci Rhone Alps Ateliers De Reparations et de Constructions Industrielles, Bourgoin Jallieu (FR)

( * ) Notice: Subject to any disclaimer, the term of this patent is extended or adjusted under 35 U.S.C. 154(b) by 336 days.

(21) Appl. No.: 11/645,813

(22) Filed: Dec. 27, 2006

(65) Prior Publication Data

US 2007/0160446 A1 Jul. 12, 2007

(30) Foreign Application Priority Data

Jan. 10, 2006 (FR) .................................. 06 00192

(51) Int. Cl.
*B65G 7/00* (2006.01)
*B66C 1/44* (2006.01)
(52) U.S. Cl. .................... 294/119.2; 294/165; 211/60.1
(58) Field of Classification Search ............. 294/119.2, 294/137, 142, 165, 31.2; 211/60.1, 164; 206/371, 443; 229/93, 106
See application file for complete search history.

(56) References Cited

U.S. PATENT DOCUMENTS

| | | | | | |
|---|---|---|---|---|---|
| 1,712,185 | A | * | 5/1929 | Whitcomb | 294/155 |
| 2,087,375 | A | * | 7/1937 | Ehrhardt | 294/161 |
| 4,045,069 | A | * | 8/1977 | Fife | 294/31.2 |
| 4,057,262 | A | | 11/1977 | Boon | |
| 4,289,237 | A | * | 9/1981 | Cutrara | 206/443 |
| 4,699,416 | A | | 10/1987 | Lacey | |
| 5,531,495 | A | * | 7/1996 | Hohman | 294/31.2 |
| 5,617,960 | A | * | 4/1997 | Bishop | 211/60.1 |

FOREIGN PATENT DOCUMENTS

| | | |
|---|---|---|
| EP | 0 978 452 | 2/2000 |
| FR | 979 696 | 4/1951 |
| FR | 2 532 627 | 3/1984 |

* cited by examiner

*Primary Examiner*—Dean J Kramer
(74) *Attorney, Agent, or Firm*—Dowell & Dowell P.C.

(57) ABSTRACT

A device for transporting segments of wood comprising an annular binding made of a material that is biodegradable and combustible such that the binding can thus be burnt in a fireplace after it has been used. The binding includes two binding rings and spacers, the rings and the spacers being assembled together by having co-operating shapes. Wedges are used to hold the segments of wood in position, without having to use a clamping band.

20 Claims, 6 Drawing Sheets

_DEVICE FOR TRANSPORTING SEGMENTS OF WOOD AND A METHOD OF PACKAGING SEGMENTS OF WOOD_

BACKGROUND OF THE INVENTION

1. Field of the Invention

The invention relates to a device for transporting segments of wood. The invention also relates to a method of packaging segments of wood.

In the meaning of the present application, a "segment of wood" can be a log or a billet of wood and, more generally, any piece of wood of given length. Such segments of wood can be used as firewood, i.e. as fuel for burning in a fireplace.

2. Brief Description of the Drawings

It is known from EP-A-0 978 452 that, for transporting segments of wood, it is possible to use a bundling set for forming fagots of about one cubic meter, and to roll that set about its own axis in order to move the bundled segments of wood. That set is made up of curved members that are made of metal, thereby imparting satisfactory rigidity to it.

However, the cost of such equipment is relatively high. In addition, when a firewood merchant delivers wood with that type of equipment, the merchant must then recover the equipment for subsequent use, and it is therefore necessary to stack the firewood immediately or to leave it in a rough pile, unless the firewood merchant agrees to come back and collect the set once the customer has emptied it by stacking the firewood. In practice, such constraints dissuade firewood merchants from using that type of equipment.

It is also known from FR-A-2 532 627 to use a frame made up of slats of wood fixed to rigid wedge-shaped edge strips by means of nails or staples. That frame can but be in the shape of a rectangular block, and can but be difficult to disassemble. In addition, the nails or staples are not biodegradable and can be dangerous for a user.

SUMMARY OF THE INVENTION

An object of the invention is more particularly to remedy those drawbacks by proposing a novel device for transporting segments of wood that is inexpensive, easy to handle, and that can be left permanently with the user of the transported segments of wood and burnt in the user's fireplace.

To this end, the invention provides a device for transporting segments of wood, said device comprising an annular binding made of a material that is biodegradable and combustible, said device being characterized in that said binding comprises two binding rings interconnected by spacers held stationary on said rings by means of the spacers and the rings having co-operating shapes.

Thanks to the invention, once the wood has been delivered, users can take as long as they like to empty the transport device, either in one go or progressively, either by forming a stack of segments of wood, or by burning the segments progressively in their fireplaces. Once the device has been emptied, the binding can also be burnt in the fireplace of the user without it being necessary for the firewood merchant to come back and collect said binding. Since the rings and the spacers are assembled together without using either nails or screws, the binding is fully combustible.

It is possible to make provision for at least one of the elements comprising one of the rings and one of the spacers to be provided with a notch for receiving the other element partially. This mode of assembly is particularly effective.

In addition, at least one wedge may be provided that is suitable for being inserted between a spacer and adjacent segments of wood disposed in the binding, said wedge coming to bear respectively against said spacer and against said adjacent segments of wood. Said wedge may be provided with parts in relief for holding it stationary relative to said spacer, said parts in relief coming selectively into engagement with a corresponding portion of said spacer, as a function of the extent of insertion to which said wedge is inserted between said spacer and said segments of wood.

The device may further comprise a key for holding said spacer while the wedge is being inserted between said spacer and adjacent segments of wood disposed in the binding, a portion of said key being suitable for capping said spacer while providing a zone through which the wedge can pass as it is being inserted, said portion being secured to a holding handle. Such a key makes it possible to prevent the friction force that is generated on inserting the wedge between the spacer and the adjacent segments of wood from breaking the spacer.

The binding may comprise two binding rings, each of which is provided with a plurality of preferential break zones. Thus, when the component portions of the binding are to be burnt, said rings can easily be broken up into pieces of size compatible with them being put in place in the hearth of a conventional fireplace.

The binding rings, the spacers, and/or the wedge are preferably molded from a mixture of wood chips or sawdust and of a binder, which materials are easy to burn in a domestic fireplace, without any risk of environmental pollution.

The binding rings are advantageously provided, on their respective inside edges, with parts in relief for wedging the adjacent segments of wood. This makes it possible for the segments of wood to be retained effectively inside the binding.

In an advantageous embodiment, the binding defines a rolling surface enabling said binding to be rolled along the ground, while said rolling surface is provided with at least one substantially plane zone suitable for enabling said device to stand stably on a plane surface. Thus, the device can be stopped in various positions as it is rolling along the ground.

In another embodiment, at least one of said spacers forms a handle for carrying said binding regardless of whether or not it is loaded with segments of wood.

The invention also provides a method of packaging segments of wood, which method can be implemented by means of a device as described above. In this method, segments are disposed in the binding, and, once said binding has been filled with segments of wood, a wedge is inserted, between at least one spacer interconnecting two binding rings, that are part of said binding, and adjacent segments of wood, said wedge serving to lock said segments in position in said binding.

Advantageously, an additional step is provided that consists in packing the wood more tightly in said binding by causing said binding to roll or by shaking it, prior to putting in place the or each wedge.

DESCRIPTION OF THE PREFERRED EMBODIMENT

The invention can be better understood and other advantages of the invention appear more clearly from the following description of two embodiments of a device for transporting segments of wood that complies with the principle of the invention, and of a method of implementing the device, the description being given merely by way of example and with reference to the accompanying drawings, in which.

Figure 1:
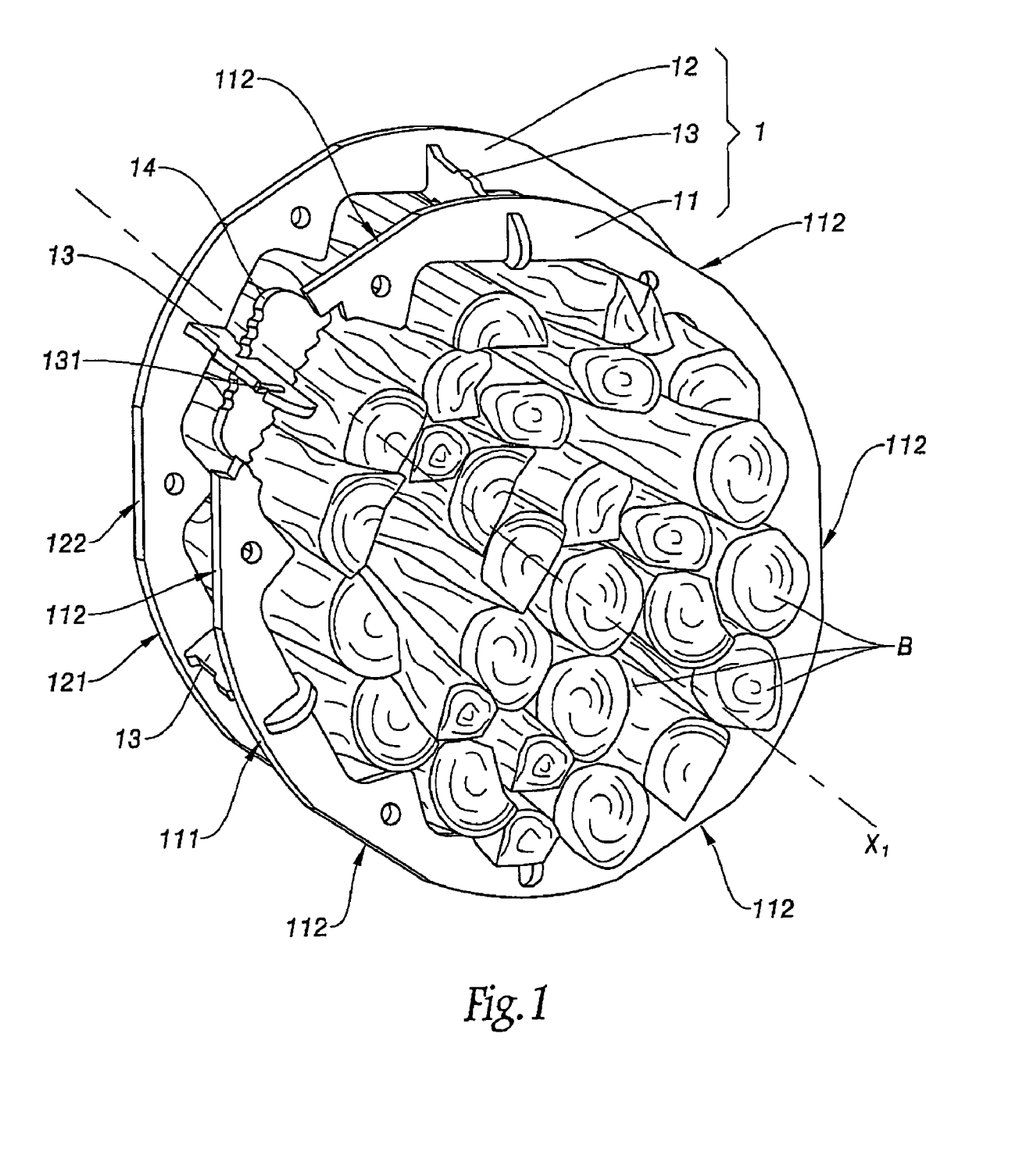
FIG. 1 is a partially cutaway perspective view of a transport device of the invention, once said device is loaded with logs.

The device for transporting segments of wood that is shown in FIG. 1 comprises a binding or ferrule 1 which is formed by assembling together two binding rings 11 and 12 interconnected by spacers 13. The binding 1 defines a volume that is substantially cylindrical for receiving logs of firewood B for fuelling a fireplace. The logs could be replaced with billets or with any other segment of wood of predetermined length.

The binding is designed to be moved, once it has been loaded with logs B, by being rolled on the ground. For this purpose, the outside edges 111 and 121 of the rings 11 and 12 are substantially circular, and each of them forms a rolling band for rolling on the ground. Each of the edges is provided with six substantially plane portions 112, 122 that make it possible for the binding 1 to be stood on plane ground without any risk of it rolling away about its central axis $X_1$. The portions 112 and 122 thus make it easier to store logs B as packaged in the binding 1.

The spacers 13 are mounted on the rings 11 and 12 by means of their co-operating shapes.

Since the rings 11 and 12 are identical, only ring 11 is described in detail below, it being possible to see this ring more particularly in FIG. 2, while one of the spacers 13 can be seen more particularly in FIG. 3.

The ring 11 is provided with six notches 113 that are distributed uniformly about its center $C_{11}$ and that extend from its inside edge 114.

Figure 2:
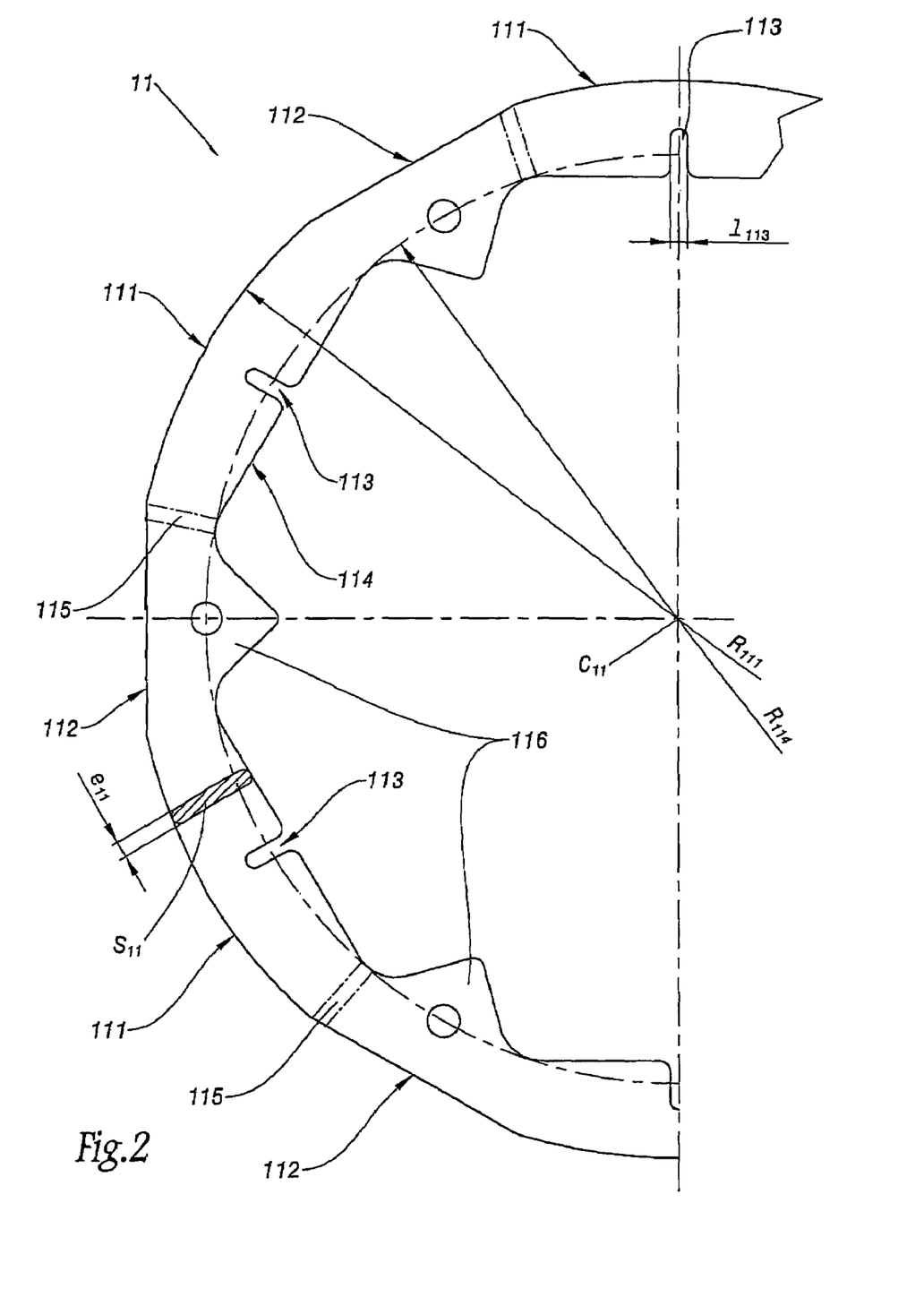
FIG. 2 is a face view of one half of a binding ring that is part of the device of FIG. 1.
Figure 3:
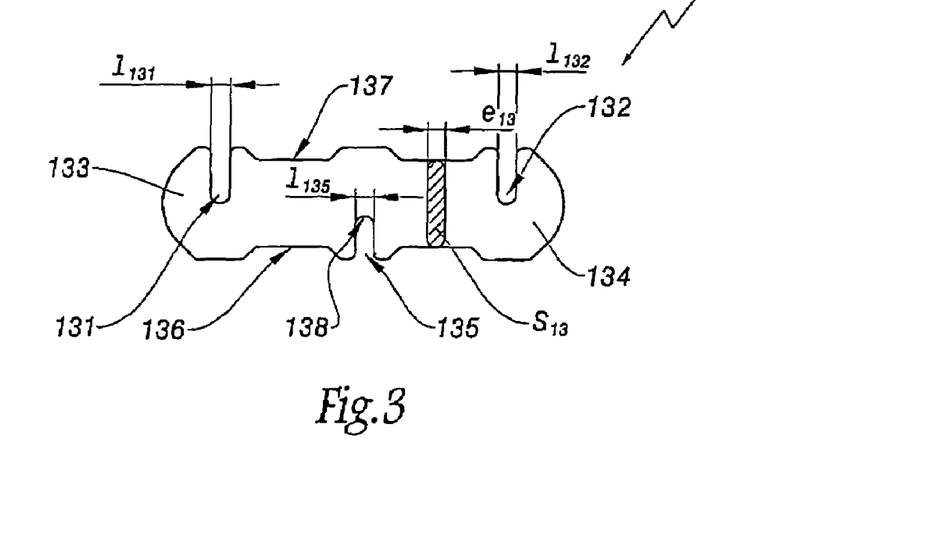
FIG. 3 is a face view on a larger scale of a spacer that is part of the device of FIG. 1.

The width $l_{113}$ of a notch 113 is slightly greater than the thickness $e_{13}$ of a spacer 13, which thickness is shown in FIG. 3 by a section $S_{13}$ of said spacer. Each notch 113 extends over about one half of the width of the ring 11, i.e. over about one half of the distance between the edges 111 and 114 of said ring at said notch 113.

The spacer 13 is provided with two notches 131 and 132 provided in the vicinities of its ends, the width $l_{131}$ of the notch 131 having a value that is slightly greater than the thickness $e_{11}$ of the ring 11 that can be seen in FIG. 2 over a second $S_{11}$ of said ring. In the same way, the notch 132 has a width $l_{132}$ that is slightly greater than the thickness of the ring 12. The notches 131 and 132 extend over substantially one half of the width $l_{13}$ of the spacer 13.

It is thus possible to insert the rings 11 and 12 partially into the notches 131 and 132 of each of the six spacers 13, the end portions 133 and 134 of said spacers, in which the notches 131 and 132 are respectively provided, being partially engaged into the notches 113 in the ring 11 and into the corresponding notches in the ring 12. In view of the widths of the notches and of the thicknesses of the elements 11, 12, and 13, they are assembled together by means of their co-operating shapes, without it being necessary to use metal fastener elements such as nails or screws.

Thus, the binding 1 can be formed without requiring any special tools and anywhere where it is desired to package segments of wood.

The elements 11, 12, and 13 are made of a material that is biodegradable and combustible. Thus, once the binding 1 has been used for storing and transporting the wood and once the wood has been extracted from the binding, it is possible to burn the elements 11, 12, and 13 in a fireplace, without harming the environment or giving off unpleasant odors.

The elements 11, 12, and 13 are made by molding a mixture of sawdust from new wood, i.e. sawdust from wood that has not been recycled, and of a binder. Since the sawdust is obtained from new wood, it is possible to avoid risks of pollution since a recycled wood can come from waste from pallets that have been treated chemically, or from wood soiled with detergents or with petroleum products. Advantageously, the sawdust is obtained from coniferous wood, e.g. spruce or pine wood.

The binder is formed by a mixture of adhesive and of water, it being possible, for example, for the adhesive to be based on diphenylmethane 4,4'diisocyanate polymer. The mixture used for molding the elements 11, 12, and 13 is, for example, about 95% sawdust and about 5% binder. After the adhesive has been polymerized during the molding operation, during which the mixture is heated, the percentage of adhesive in the elements 11, 12, and 13 is approximately in the range 3% to 4%.

The elements 11, 12, and 13 can thus be burnt without any apprehension in a fireplace in the same way as a log can. The elements can optionally also be disposed of at tips as solid wood waste. They are biodegradable and can even be composted, like any densified wood, it being understood that it is then preferable to moisten them regularly in order to facilitate decomposition of them.

Once the binding has been constituted by assembling together two rings 11 and 12 and six spacers 13, as explained above, said binding is loaded, i.e. substantially filled, with logs B. Advantageously, as shown in FIG. 6, the binding 1 is then stood on a support 2 provided with two wheels 21 on which the binding 1 rests, while being able to turn about its axis $X_1$, as shown by the double-headed arrow $F_1$ in FIG. 5.

Each spacer 13 is provided with a notch 135 provided in its central portion, in its edge 136 that is opposite to the edge 137 from which the notches 131 and 132 are formed. Thus, when a spacer 13 is in place between the rings 11 and 12, its notch 135 faces towards the internal volume of the binding 1, i.e. towards the adjacent logs B.

Figure 6:
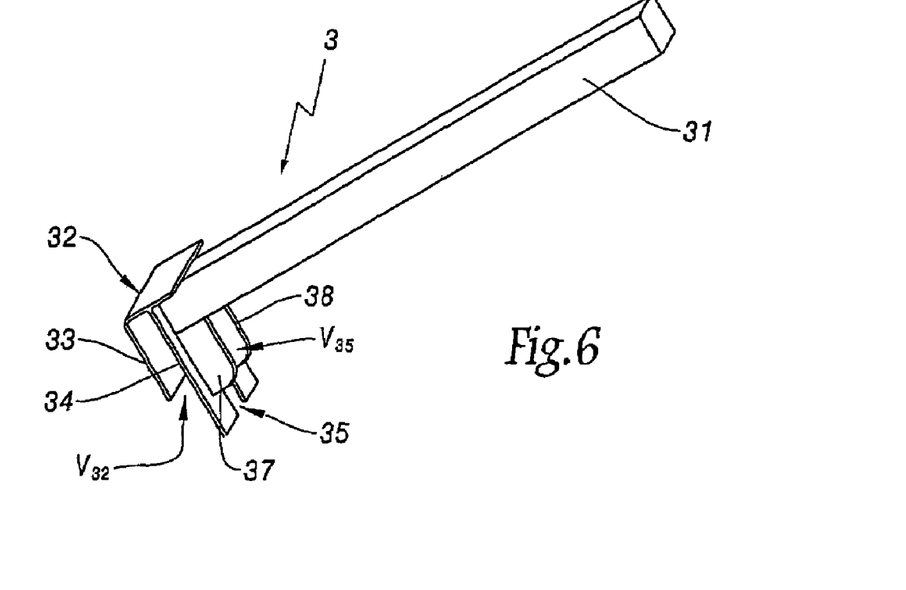
FIG. 6 is a view on a larger scale of a holding key used in the method step shown in FIG. 5.

In order to hold the logs B stationary in the binding 1, six wedges 14 are provided, each of which serving to be inserted between a respective one of the spacers 13 and the adjacent logs B, as shown by arrow $F_2$ in FIG. 6.

Figure 4:
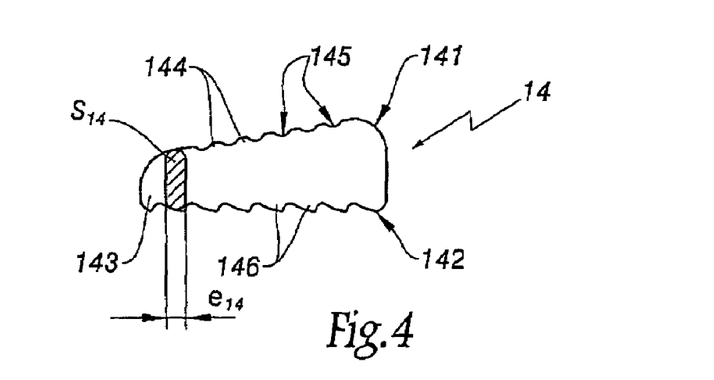
FIG. 4 is a face view on the same scale as in FIG. 3 of a wedge that is part of the device of FIG. 1.

One of the wedges 14 can be seen more particularly in FIG. 4, its cross-section being shown in FIG. 4 with the reference $S_{14}$. The reference $e_{14}$ designates the thickness of the wedge 14 that is slightly less than the width $l_{135}$ of the notch 135. Thus, the wedge 14 can be engaged into and retained in position in the notch 135. The top and bottom edges 141 and 142 of the wedge 14 in the configuration shown in FIG. 4 diverge starting from its front end 143 shown on the left of the figure. Thus, if a wedge 14 is inserted between a spacer 13 and the adjacent logs B with its end 143 facing forwards, the more deeply the wedge is engaged between the spacer 13 and the adjacent logs B, the larger the centripetal force exerted by said wedge on the logs B.

The edge 141 of each wedge 14 is provided with a series of projections 144 and of recesses 145 in succession, these pieces in relief coming to bear against the end wall 138 of the notch 135 in the corresponding spacer 13, as the wedge 114 is inserted into the notch 135. Thus, the pieces in relief 144 and 145 form means for retaining each wedge 14 in position relative to the spacer 13 against which it is mounted.

The edge 142 of each wedge 14 is provided with teeth 146 for catching on the adjacent log(s) B.

The wedges 14 are made of the same material as the elements 11, 12, 13 so that they can be disposed of in the same manner.

In order to prevent the friction force that is exerted by the edge 141 of a wedge 14 on the end-wall 138 of the notch 135 in a spacer 13 from breaking said spacer, a key 3 is also part of the device of the invention. Said key is made of metal and it has a handle 31 designed to be taken hold of by a user, and a portion 32 that is designed to cap the mid-portion of the outside edge 137 of a spacer 13 so as to withstand the friction force due to the wedge 14 being put in place. The portion 32 has a substantially channel section and its internal volume $V_{32}$ has a width slightly greater than the thickness $e_{13}$. The portion 32 is defined between two sheet metal plates 33 and 34, plate 34 being provided with a notch 35 that is in communication with another volume $V_{35}$, itself defined between two reinforcing sheet metal plates 37 and 38 welded to that face of the sheet metal plate 34 which faces away from sheet metal plate 33, the reinforcing plates being welded perpendicularly to said sheet metal plate 34. The volume $V_{35}$ and the notch 35 form a zone through which the wedge 14 can pass on being inserted between a spacer 13 and the adjacent logs B. Thus, the portion 32 holds the spacer 13 effectively, without the key 3 hindering putting in place the corresponding wedge 14.

The inside edge 114 of the ring 11 is provided with six teeth 116 designed to improve locking the logs B inside the binding 1. In a variant, a different number of teeth can be provided, it being possible for them to be irregular in shape, thereby further improving the resulting locking effect.

Figure 5:
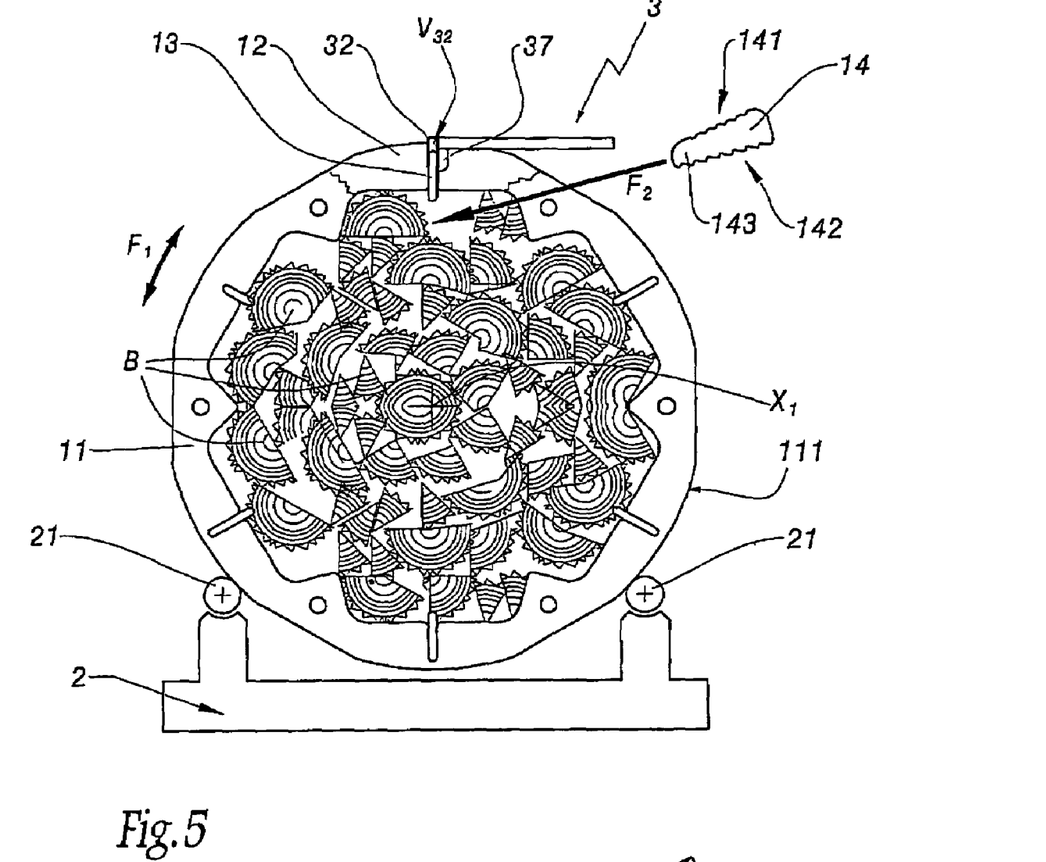
FIG. 5 is a view on a smaller scale, showing a step of a method of packaging segments of wood that is implemented by means of the device of FIGS. 1 to 4.

The device of the invention operates as follows: once the binding 1 has been substantially filled with logs B, it is caused to turn about its axis $X_1$ on the wheels 21 and as indicated by the double-headed arrow $F_1$ in FIG. 5, so as to pack the logs more tightly together. If necessary, additional logs can then be added.

Once the internal volume of the binding 1 is filled with logs, one of the spacers 13 that is situated in the top portion of the binding 1 is capped with the portion 32 of the key 3, and a wedge 14 is put in place as explained above and as indicated by arrow $F_2$ in FIG. 5.

The binding 1 is then turned through about 60° so as to bring one of the adjacent spacers into the top position. Another wedge 14 is then put in place in the vicinity of this second spacer, by using the key 3.

This operation is continued until a wedge has been inserted into the central notch 135 of each of the spacers 13.

In a variant, it is possible not to put a wedge between every spacer 13 and the adjacent logs, in particular if the logs are already held stationary firmly after two or three wedges have been put in place.

This manner of holding the logs B stationary inside the volume of the binding 1 makes it possible to avoid having to use a strap or a metal clamping band.

In order to facilitate disposing of the rings 11 and 12 once they have been emptied of the wood that they contain, each of the rings is provided with preferential break zones formed by portions of smaller thickness that are shown in FIG. 2 with the reference 115, and that are distributed uniformly about the center of the ring, $C_{11}$ or equivalent. In the example, six portions 115 are provided, thereby making it possible to constitute segments or pieces of ring 11 or 12 that each correspond to an angular sector of about 60° and that are of length enabling them to be put in place in a normal fireplace hearth. A different number of portions 115 can be provided.

The radius $R_{111}$ of the edge 111 in its circular portions is equal to about 500 millimeters (mm). The maximum inside radius $R_{114}$ of the edge 114 is equal to about 438 mm. With the geometrical configuration shown in FIG. 2, the inside surface area of the ring 11 is about 0.533 square meters ($m^2$), which is very advantageous.

The invention is shown with a binding 1 whose rings 11 and 12 have six plane portions 112 and 122, while six spacers 13 and six wedges 14 are provided. The numbers of said plane portions, of said spacers, and of said wedges can be varied. There are preferably greater than three. The number of plane portions is not necessarily equal to the number of spacers.

Figure 1A:
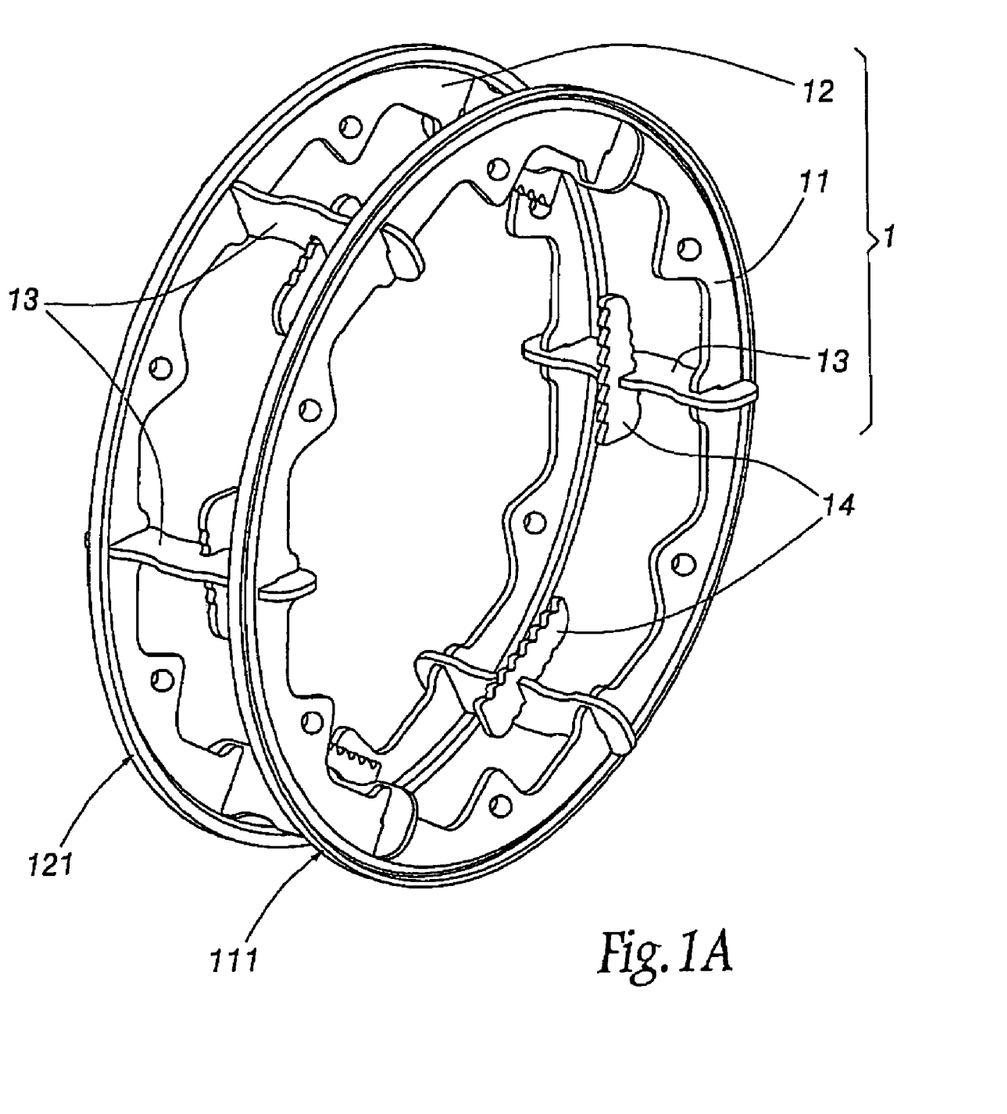
FIG. 1A is a perspective view analogous to the FIG. 1 view and showing the device as empty and from another angle, and incorporating a variant of the outside edges of the binding rings.

As shown in FIG. 1A only, the outside edges 111 and 121 of the rings 11 and 12 can be free of any plane portions, i.e. circular, in which case the binding is easier to roll on the ground.

Even if the values of the radii of the rings that are indicated above are very advantageous, they are not limiting. In practice, the capacity of the binding 1 can vary in the range about 30 liters for a consumer model and about half a cubic meter, or even one cubic meter, for a "professional" model.

Figure 7:
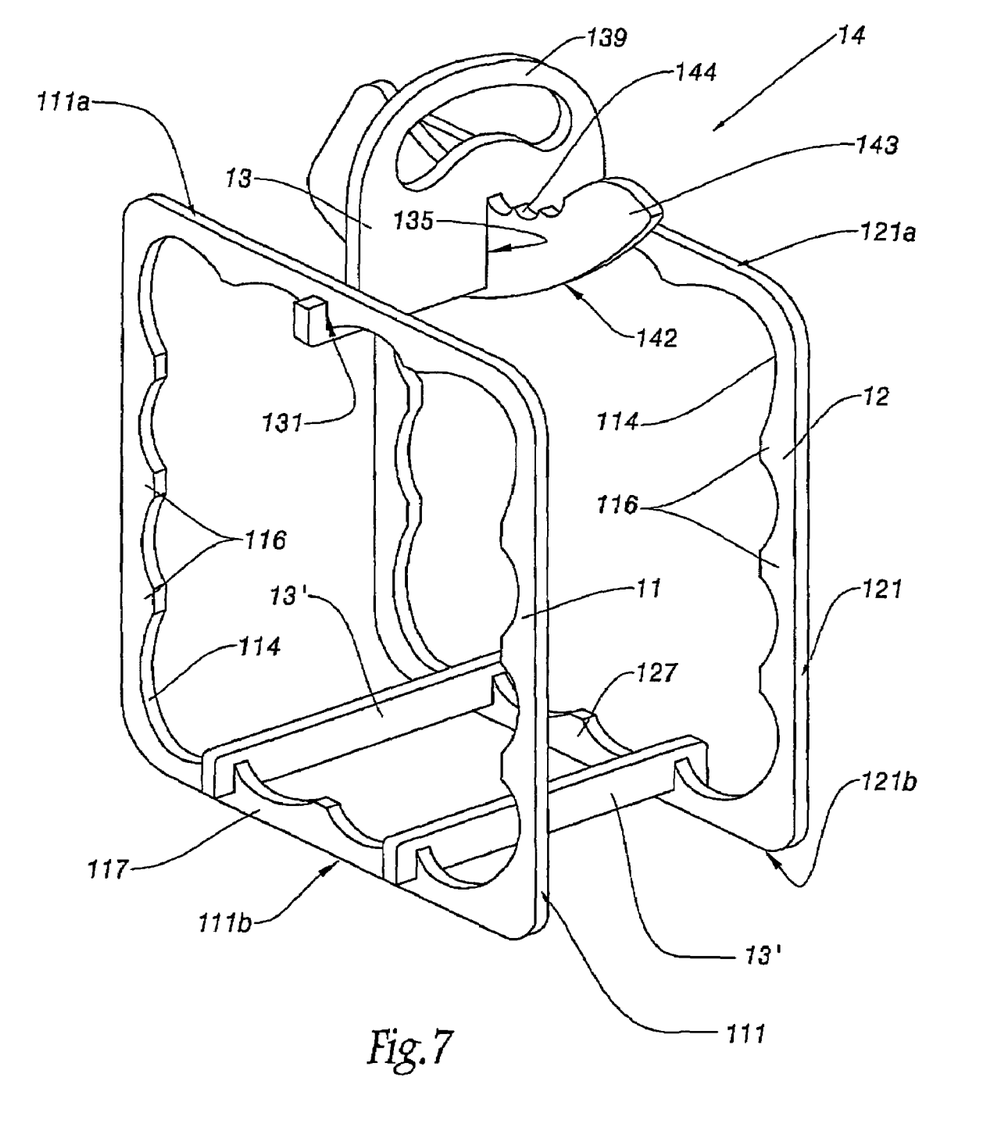
FIG. 7 is a perspective view on a larger scale than in FIG. 1 of a second embodiment of a transport device of the invention.
Figure 8:
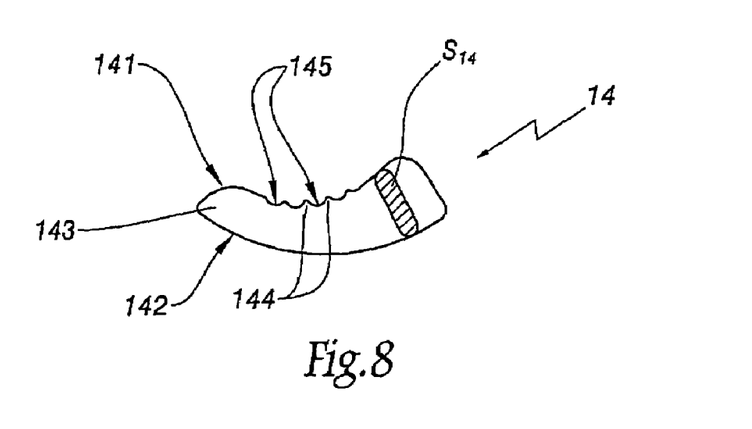
FIG. 8 is a view analogous to the FIG. 4 view, and on the same scale, showing a wedge of the device of FIG. 7.

In the second embodiment shown in FIGS. 7 and 8, elements that are analogous to the elements of the first embodiment are given references that are identical to the references of the first embodiment. The wood transport device of this embodiment is designed to transport small logs or billets in relatively small quantities, of the order of 40 liters or even of 25 liters. It comprises two binding rings 11 and 12 that are interconnected by a top spacer 13 and by two bottom spacers 13' that are assembled together by having co-operating shapes. The inside edges 114 of the rings 11 and 12 are provided with teeth 116 making it easier to retain the logs in the cylindrical volume of substantially square section that is defined by the rings 11 and 12. The outside edges 111 and 112 of the rings 11 and 12 are of substantially square section, with rounded corners, so that the binding made up of the elements 11, 12, 13, and 13' is not designed to roll on the ground.

The spacer 13 forms a handle 139 obtained by forming a cutout in the spacer 13, thereby making it possible to carry the wood transport device as empty or as loaded with segments of wood.

As in the first embodiment, the spacers 13 and 13' are provided with notches, one of which is shown in FIG. 7 with the reference 131, enabling them to be mounted on the rings 11 and 12. The rings 11 and 12 are provided with notches that cannot be seen in FIG. 7 but that are analogous to the notches 113 of the first embodiment. The rings 11 and 12 could however be free of notches of the same type as the notches 113 of the first embodiment, in particular in their bottom portions that are designed to co-operate with the spacers 13'.

The spacer 13 is provided with a notch 135 for receiving a wedge 14 that can be seen more particularly in FIG. 8. This wedge 14 is substantially crescent-shaped with its edges 141 and 142 diverging as they extend away from its front end 143. The edge 141 is provided with a succession of projections 144 and of recesses 145 that enable it to co-operate with the end-wall of the notch 135. The edge 142 is tooth-free. Its arcuate shape enables the locking force obtained by means of the wedge 14 to be increased progressively.

In a variant, the wedge 14 shown in FIG. 8 can be replaced with a wedge having rectilinear edges, of the same type as shown in FIG. 4, it being possible for its edges to be free of any projections and of any teeth, i.e. substantially smooth.

In a variant of the invention that is not shown, the second embodiment of the device can also have binding rings whose outside edges are substantially circular, so that it can roll on the ground. Thus, users can, as they wish, either carry the device or roll it along.

The elements 11, 12, 13, 13', and 14 can be made of the same material as the elements of the first embodiment or of some other material that is biodegradable and combustible.

Once the binding formed by the elements 11, 12, 13, and 13' of this embodiment has been substantially filled with logs, it is possible to shake it so as to pack the logs more tightly, before topping it up with logs and putting the wedge 14 in place.

The top and rectilinear portions 111a and 121a of the edges 111 and 121 are arched convexly whereas there bottom and rectilinear portions 111b and 121b are arched concavely. Thus, two bindings 1 can be stacked up on each other, the portions 111a and 121a of the lower binding engaging at least partially into the portions 111b and 121b of the upper binding.

In a variant of the invention (not shown) and in order to facilitate stacking up, each of the bottom bars 117 and 127 of the rings 11 and 12 is provided with a central portion that is provided with an upwardly extending bend so that the internal volume of the binding does not interfere with the space occupied by the handle 139 of a binding situated below it.

Regardless of the embodiment, the teeth 116 are optional. In other words, the edges 114 can be smooth.

The technical characteristics of the embodiments described can be mutually combined within the ambit of the invention as defined in the accompanying set of claims.

The invention claimed is:

1. A device for transporting segments of wood, said device comprising, an annular binding made of a material that is biodegradable and combustible, said binding including two binding rings interconnected by spacers held stationary on said rings as said spacers and said rings have co-operating shapes so as to be interlocked with one another, and at least one wedge inserted between one of said spacers and adjacent segments of wood disposed in said binding, said wedge adapted to bear respectively against said one of said spacers and against said adjacent segments of wood.

2. A device according to claim 1, wherein at least one of said rings and one of said spacers is provided with a notch for partially receiving the other of said at least one of said rings and one of said spacers.

3. A device according to claim 1, wherein said at least one wedge is provided with parts in relief for holding said at least one wedge stationary relative to said spacers, said parts in relief coming selectively into engagement with a corresponding portion of one of said spacers, as a function of the extent of insertion to which said wedge is inserted between said one of said spacers and said segments of wood.

4. A device according to claim 1, including a key for holding said one of said spacers while said at least one wedge is being inserted between said one of said spacers and adjacent segments of wood disposed in the binding, a portion of said key capping said one of said spacers while providing a zone through which said at least one wedge can pass as it is being inserted, said portion being secured to a holding handle.

5. A device according to claim 1, wherein each of said two binding rings is provided with a plurality of break zones.

6. A device according to claim 1, wherein said binding rings, said spacers and said at least one wedge are molded from a mixture of wood chips or sawdust and a binder.

7. A device according to claim 1, wherein said binding rings are provided, on their respective inside edges, with parts in relief for wedging against adjacent segments of wood.

8. A device according to claim 1, wherein said binding defines a rolling surface enabling said binding to be rolled along the ground, and in that said rolling surface is provided with at least one substantially plane zone for enabling said device to remain stable on a plane surface.

9. A device according to claim 1, wherein at least one of said spacers forms a handle for carrying said binding regardless of whether or not said binding is loaded with segments of wood.

10. A method of packaging segments of wood, in which method said segments are disposed in a binding of a device for transporting segments of wood and wherein the device includes an annular binding made of a material that is biodegradable and combustible and includes two binding rings interconnected by spacers held stationary on the rings as the spacers and the rings have co-operating shapes so as to be interlocked with one another, the method including placing segments of wood within the binding, thereafter inserting a wedge between at least one spacer and adjacent segments of wood to lock the segments in position within the binding.

11. A method according to claim 10, including an additional step consisting in packing the wood more tightly in the binding by rolling or by shaking the binding prior to inserting the wedge.

12. A device for transporting segments of wood, said device comprising, an annular binding made of a material that is biodegradable and combustible, said binding including two binding rings interconnected by spacers held stationary on said rings as said spacers and said rings have co-operating shapes so as to be interlocked with one another, and each of said two binding rings being provided with a plurality of break zones.

13. A device according to claim 12, wherein at least one of said rings and one of said spacers is provided with a notch for partially receiving the other of said at least one of said rings and one of said spacers.

14. A device according to claim 12, including at least one wedge adapted to be inserted between one of said spacers and adjacent segments of wood in said binding, a key for holding said one of said spacers while said at least one wedge is being inserted between said one of said spacers and adjacent segments of wood disposed in the binding, a portion of said key capping said one of said spacers while providing a zone through which said at least one wedge can pass as it is being inserted, and said portion being secured to a holding handle.

15. A device according to claim 12, wherein said binding rings are provided, on their respective inside edges, with parts in relief for wedging against adjacent segments of wood.

16. A device according to claim 12, wherein said binding defines a rolling surface enabling said binding to be rolled along the ground, and in that said rolling surface is provided with at least one substantially plane zone for enabling said device to remain stable on a plane surface.

17. A device for transporting segments of wood, said device comprising, an annular binding made of a material that is biodegradable and combustible, said binding including two binding rings interconnected by spacers held stationary on said rings as said spacers and said rings have co-operating shapes so as to be interlocked with one another, and wherein said binding rings are provided, on their respective inside edges, with parts in relief for wedging against adjacent segments of wood.

18. A device according to claim 17, wherein at least one of said rings and one of said spacers is provided with a notch for partially receiving the other of said at least one of said rings and one of said spacers.

19. A device according to claim 17, including at least one wedge adapted to be inserted between one of said spacers and adjacent segments of wood in said binding, a key for holding said one of said spacers while said at least one wedge is being inserted between said one of said spacers and adjacent segments of wood disposed in the binding, a portion of said key capping said one of said spacers while providing a zone through which said at least one wedge can pass as it is being inserted, and said portion being secured to a holding handle.

20. A device according to claim 17, wherein said binding defines a rolling surface enabling said binding to be rolled along the ground, and in that said rolling surface is provided with at least one substantially plane zone for enabling said device to remain stable on a plane surface.

* * * * *